US012222965B2

(12) United States Patent
Martin et al.

(10) Patent No.: US 12,222,965 B2
(45) Date of Patent: Feb. 11, 2025

(54) CONSTRAINED MULTI-LABEL DATASET PARTITIONING FOR AUTOMATED MACHINE LEARNING

(71) Applicant: Disney Enterprises, Inc., Burbank, CA (US)

(72) Inventors: Marc Junyent Martin, Barcelona (ES); Miquel Angel Farre Guiu, Bern (CH)

(73) Assignee: Disney Enterprises, Inc., Burbank, CA (US)

( * ) Notice: Subject to any disclaimer, the term of this patent is extended or adjusted under 35 U.S.C. 154(b) by 275 days.

(21) Appl. No.: 17/196,742

(22) Filed: Mar. 9, 2021

(65) Prior Publication Data

US 2022/0292116 A1   Sep. 15, 2022

(51) Int. Cl.
*G06F 16/28* (2019.01)
*G06F 16/27* (2019.01)
*G06N 20/00* (2019.01)

(52) U.S. Cl.
CPC .......... *G06F 16/285* (2019.01); *G06F 16/278* (2019.01); *G06N 20/00* (2019.01)

(58) Field of Classification Search
CPC ...... G06F 16/285; G06F 16/278; G06N 20/00
See application file for complete search history.

(56) References Cited

U.S. PATENT DOCUMENTS

| 10,846,141 | B1 * | 11/2020 | Hermoni | H04L 43/06 |
| 2018/0060744 | A1 * | 3/2018 | Achin | G06N 20/00 |
| 2018/0158463 | A1 * | 6/2018 | Ge | G10L 17/04 |
| 2019/0289372 | A1 * | 9/2019 | Merler | G06V 20/46 |
| 2019/0332942 | A1 * | 10/2019 | Wang | G06F 17/13 |
| 2021/0064829 | A1 * | 3/2021 | Lavallée | G06F 40/30 |

(Continued)

FOREIGN PATENT DOCUMENTS

| AU | 2005244589 A1 * | 7/2007 | |
| KR | 2019078692 A * | 7/2019 | G06F 16/2219 |

OTHER PUBLICATIONS

Sechidis ("On the Stratification of Multi-Label Data", Dept. of Informatics, Aristotle University of Thessaloniki, 2011) (Year: 2011).*

(Continued)

*Primary Examiner* — Apu M Mofiz
*Assistant Examiner* — Farhad Agharahimi
(74) *Attorney, Agent, or Firm* — Farjami & Farjami LLP

(57) ABSTRACT

A system includes a computing platform having processing hardware and a memory storing a software code. The processing hardware executes the software code to receive a dataset including at least some data samples having multiple metadata labels, and identify a partitioning constraint and a partitioning of the dataset into data subsets. The software code also executed obtains, for each metadata label, a desired distribution ratio based on the number of the data subsets and a total number of instances that each metadata label has been applied to the data samples, aggregates, using the partitioning constraint, the data samples into data sample groups, assigns, using the partitioning constraint and the desired distribution ratio for each of the metadata labels, each of the data sample groups to one of the data subsets, wherein each of the data subsets are unique, and trains, using one of the data subsets, a machine learning model.

20 Claims, 5 Drawing Sheets

(56) References Cited

U.S. PATENT DOCUMENTS

2021/0070310 A1\* 3/2021 Zhu .................... B60W 40/13
2022/0222683 A1\* 7/2022 Patten, Jr. ............. G06N 20/00

OTHER PUBLICATIONS

Espacenet English Language Translation of Jae (Year: 2019).\*
"On the Stratification of Multi-Label Data" by Sechidis et al. (Aristotle University of Thessaloniki 2011).

\* cited by examiner

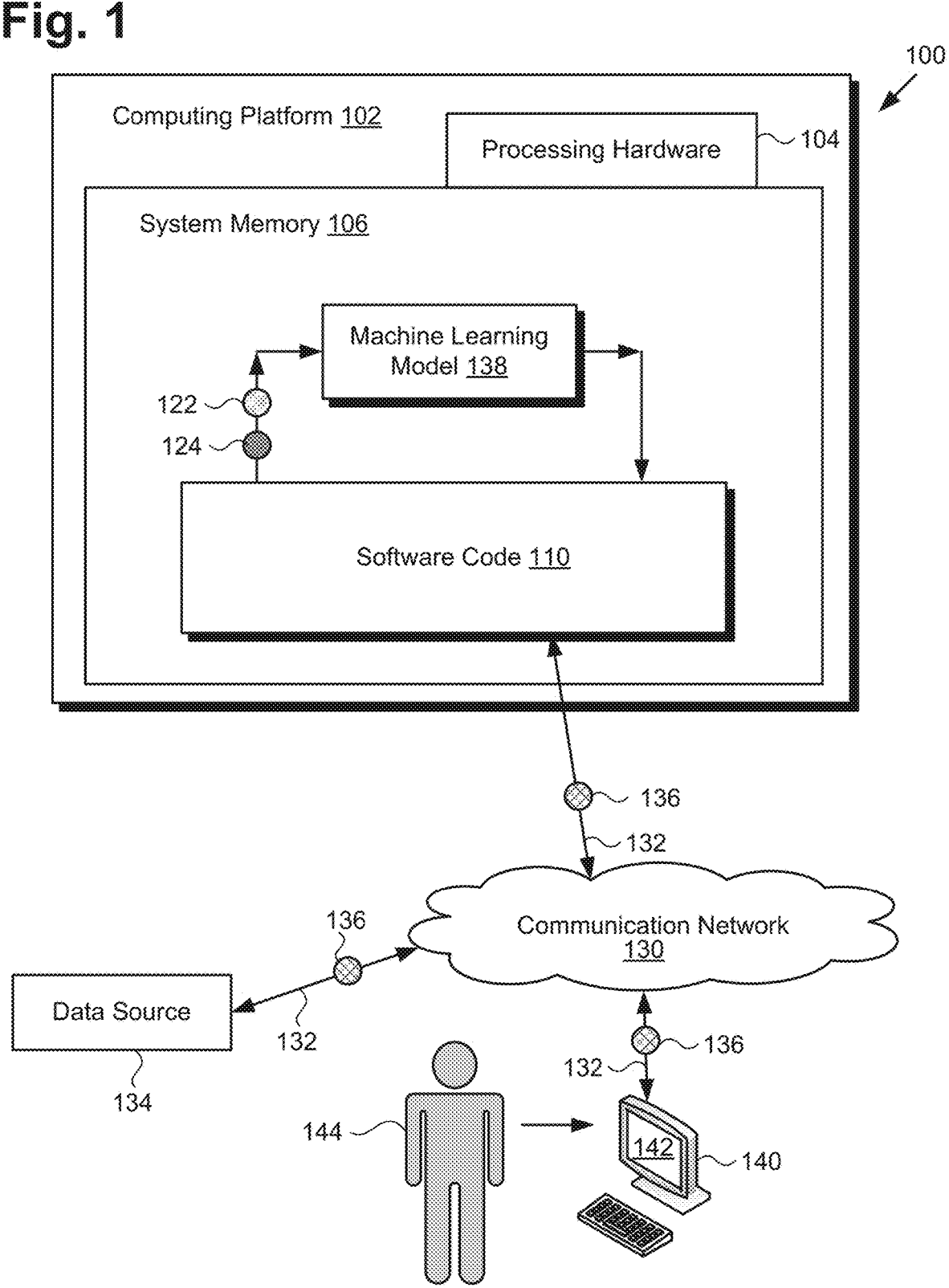

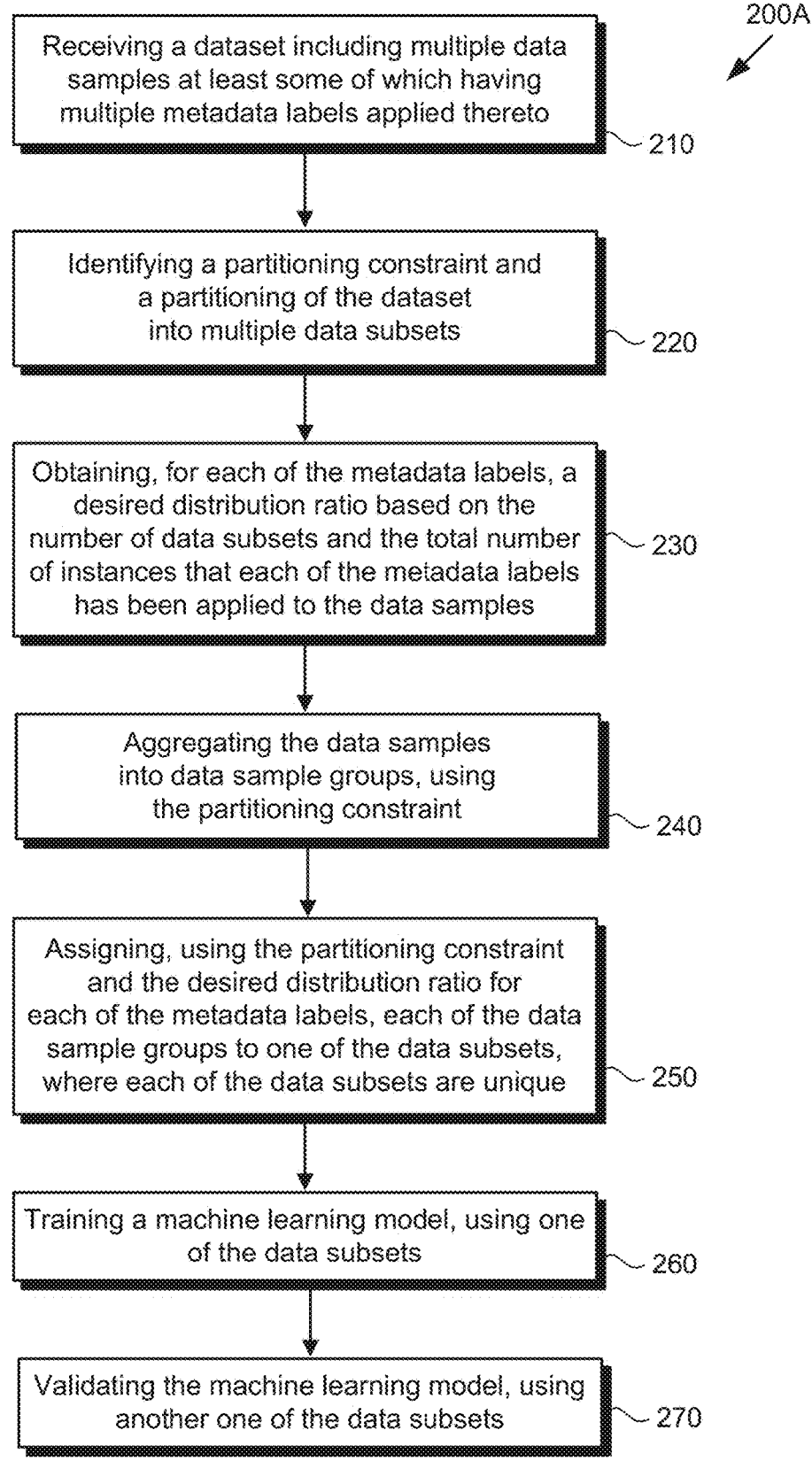

CONSTRAINED MULTI-LABEL DATASET PARTITIONING FOR AUTOMATED MACHINE LEARNING

BACKGROUND

Media content in the form of video, audio, and text, for example, is continuously being produced and made available to users whose appetite for such content is nearly limitless. As a result, the efficiency with which media content can be annotated and managed, as well as the accuracy with which annotations are applied to the media content, have become increasingly important to the producers and owners of that content.

For example, annotation of video is an important part of the production process for television (TV) programming and movies, and is typically performed manually by human annotators. However, such manual annotation, or "tagging," of video is a labor intensive and time consuming process. Moreover, in a typical video production environment there may be such a large number of videos to be annotated that manual tagging becomes impracticable. In response, automated solutions for annotating media content have been developed. While offering efficiency advantages over traditional manual tagging, automated annotation systems are typically more prone to error than human taggers. In order to improve the accuracy of automated annotation systems, it is desirable to ensure that the data used to train such systems does not overlap with data used to validate those systems for use. Consequently, there is a need in the art for an automated solution for appropriately partitioning datasets for use in training and validation of automated annotation systems.

BRIEF DESCRIPTION OF THE DRAWINGS

FIG. 1 shows an exemplary system for performing constrained multi-label dataset partitioning for automated machine learning, according to one implementation;

FIG. 2A shows a flowchart presenting an exemplary method for performing constrained multi-label dataset partitioning for automated machine learning, according to one implementation;

DETAILED DESCRIPTION

Figure 2B:
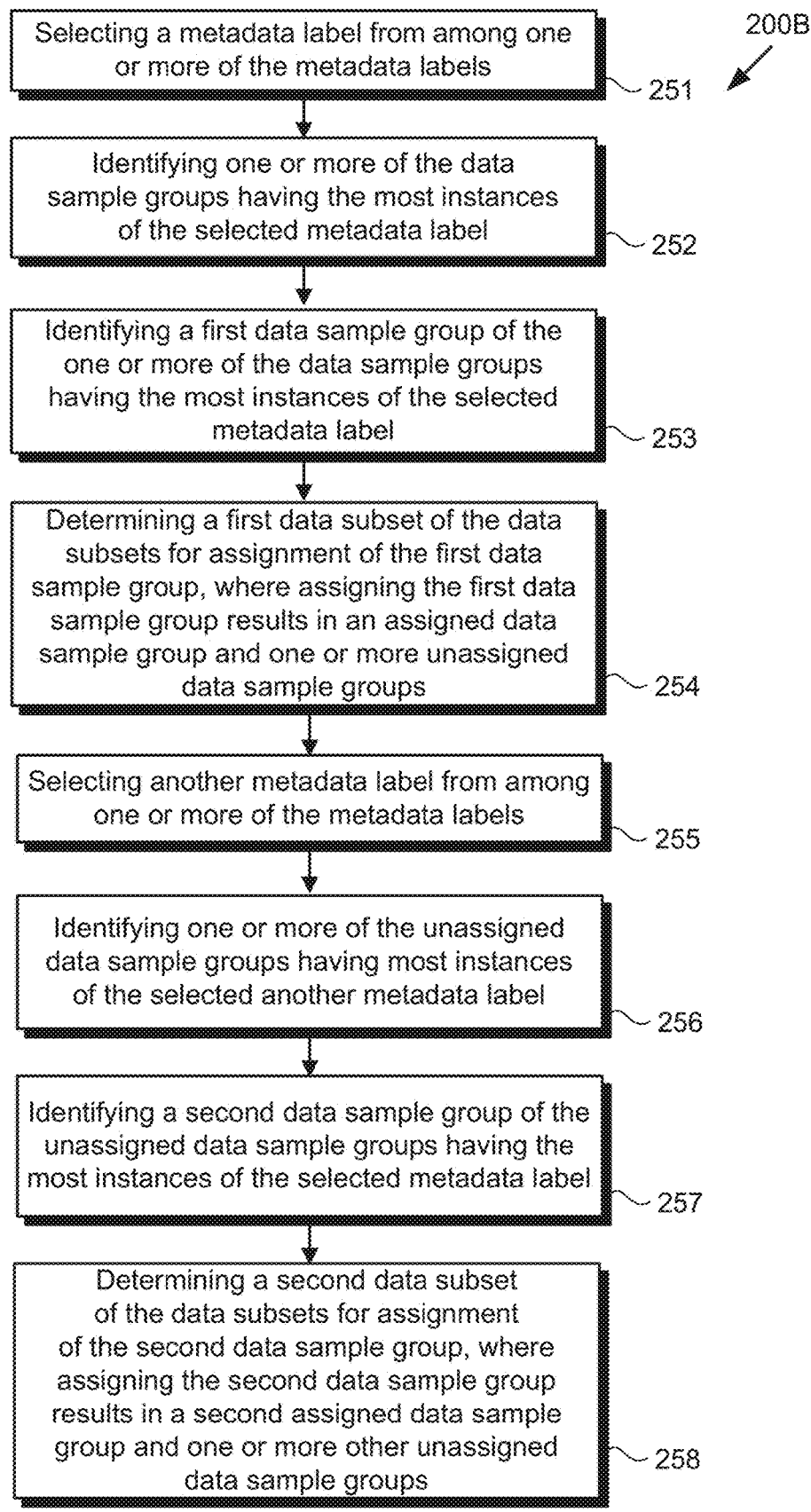
FIG. 2B shows a flowchart presenting a more detailed outline of the data group assignment included in the flowchart of FIG. 2A, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions. The present application discloses constrained multi-label dataset partitioning systems and methods for automated machine learning that overcome the drawbacks and deficiencies in the conventional art. It is noted that although the present solution is described below in detail by reference to the exemplary use case of media content dataset partitioning, the present novel and inventive principles may more generally find other applications to increasing automation and efficiency for a variety of machine learning training processes.

It is further noted that, as used in the present application, the terms "automation," "automated," and "automating" refer to systems and processes that do not require human intervention. Although, in some implementations, a human system administrator may review or even modify dataset partitioning determinations made by the systems described herein, that human involvement is optional. Thus, in some implementations, the constrained multi-label dataset partitioning systems and methods for automated machine learning described in the present application may be performed under the control of hardware processing components executing them.

Moreover, as defined in the present application, the expression "machine learning model" may refer to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models, Bayesian models, or neural networks (NNs).

A "deep neural network," in the context of deep learning, may refer to an NN that utilizes multiple hidden layers between input and output layers, which may allow for learning based on features not explicitly defined in raw data. As used in the present application, a feature identified as an NN refers to a deep neural network. In various implementations, NNs may be trained as classifiers and may be utilized to perform image processing, natural-language processing or any other kind of signal processing.

FIG. 1 shows an exemplary system for performing constrained multi-label dataset partitioning for automated machine learning, according to one implementation. As shown in FIG. 1, system 100 includes computing platform 102 having processing hardware 104 and system memory 106 implemented as a non-transitory storage device. According to the present exemplary implementation, system memory 106 stores software code 110 and machine learning model 138.

As further shown in FIG. 1, system 100 is implemented within a use environment including communication network 130, data source 134, and user system 140 including display 142. In addition, FIG. 1 shows user 144, dataset 136, training data subset 122 of dataset 136, and validation data subset 124 of dataset 136. Also shown in FIG. 1 are network communication links 132 of communication network 130 interactively connecting system 100 with data source 134 and user system 140.

With respect to the representation of system 100 shown in FIG. 1, it is noted that although machine learning model 138 is shown as a component of system 100, that representation is merely exemplary. In other implementations, machine learning model 138 may be remote from system 100 and may be communicatively coupled to system 100 via communication network 130 and network communication links 132, so as to be accessible to software code 110. That is to say, in some implementations, system 100 may omit machine learning model 138.

It is further noted that although software code 110 and machine learning model 138 are depicted as being stored in system memory 106, more generally, system memory 106 may take the form of any computer-readable non-transitory storage medium. The expression "computer-readable non-transitory storage medium," as used in the present application, refers to any medium, excluding a carrier wave or other transitory signal that provides instructions to a hardware processor of a computing platform, such as processing hardware 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

Moreover, although FIG. 1 depicts software code 110 as being stored in its entirety in system memory 106, that representation is also merely provided as an aid to conceptual clarity. More generally, system 100 may include one or more computing platforms, such as computer servers for example, which may be co-located, or may form an interactively linked but distributed system, such as a cloud-based system, for instance. As a result, processing hardware 104 and system memory 106 may correspond to distributed processor and memory resources within system 100. Thus, it is to be understood that in some implementations, various features of software code 110, such as the exemplary software modules shown and described by reference to FIG. 3, may be stored remotely from one another within the distributed memory resources of system 100.

Processing hardware 104 may include multiple hardware processing units, such as one or more central processing units, one or more graphics processing units, and one or more tensor processing units. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) processes such as machine learning.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network.

Although user system 140 is shown as a desktop computer in FIG. 1, that representation is provided merely as an example as well. More generally, user system 140 may be any suitable mobile or stationary computing device or system that includes display 142 and implements data processing capabilities sufficient to implement the functionality ascribed to user system 140 herein. For example, in other implementations, user system 140 may take the form of a laptop computer, tablet computer, or smartphone, for example.

With respect to display 142 of user system 140, display 142 may be physically integrated with user system 140 or may be communicatively coupled to but physically separate from user system 140. For example, where user system 140 is implemented as a smartphone, laptop computer, or tablet computer, display 142 will typically be integrated with user system 140. By contrast, where user system 140 is implemented as a desktop computer, display 142 may take the form of a monitor separate from user system 140 in the form of a computer tower. Furthermore, display 142 of user system 140 may be implemented as a liquid crystal display (LCD), a light-emitting diode (LED) display, an organic light-emitting diode (OLED) display, a quantum dot (QD) display, or any other suitable display screen that performs a physical transformation of signals to light.

The functionality of software code 110 will be further described by reference to FIGS. 2A and 2B in combination with FIGS. 1 and 3. FIG. 2A shows flowchart 200A presenting an exemplary method for performing constrained multi-label dataset partitioning for automated machine learning, while FIG. 2B shows flowchart 200B presenting a more detailed outline of action 250 in flowchart 200A, according to one implementation. With respect to the method outlined in FIGS. 2A and 2B, it is noted that certain details and features have been left out of flowcharts 200 and action 250 in order not to obscure the discussion of the inventive features in the present application.

Figure 3:
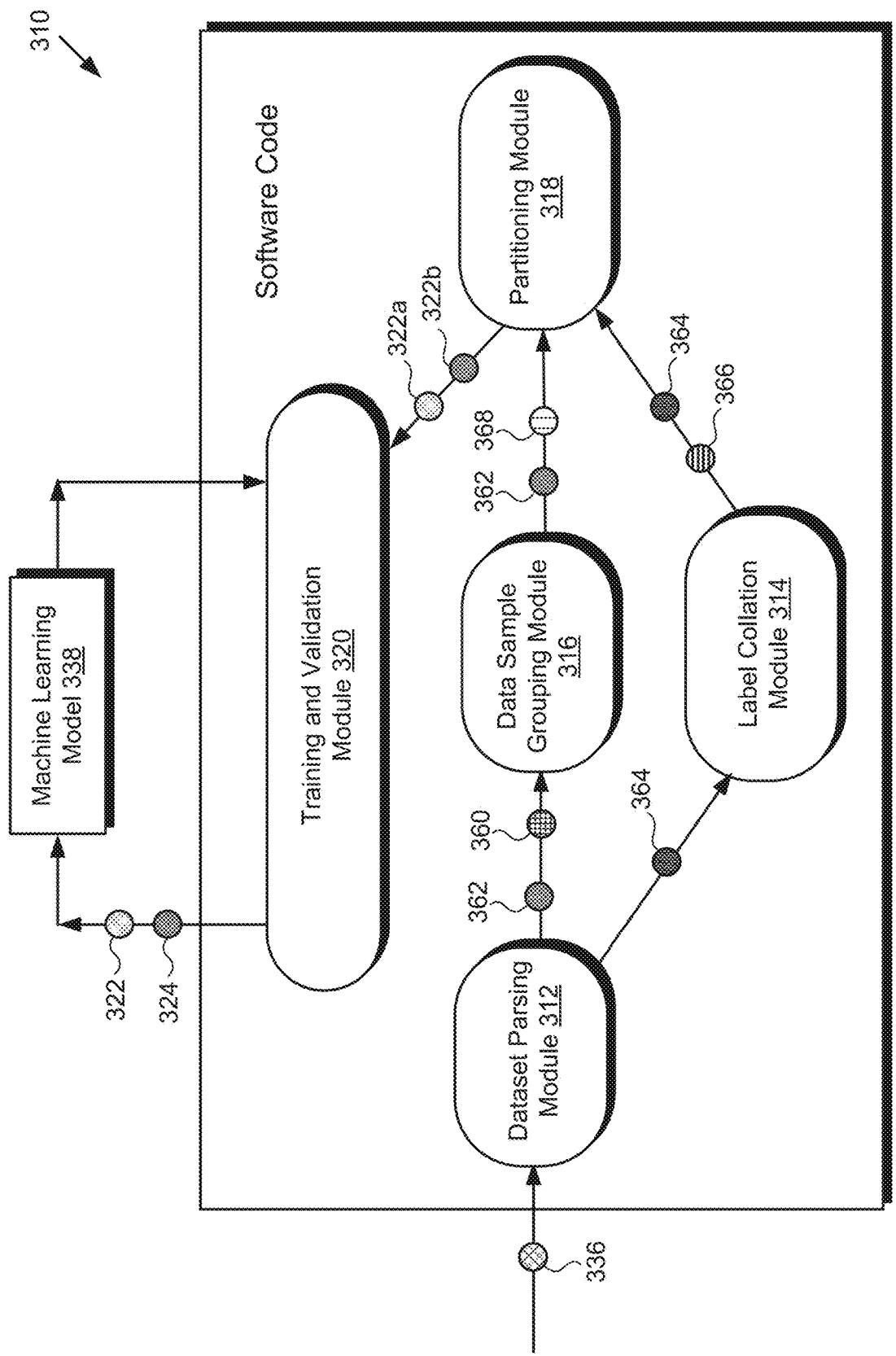
FIG. 3 shows a more detailed depiction of a software code suitable for use by the system shown in FIG. 1, according to one implementation.

FIG. 3 shows a more detailed depiction of software code suitable for execution by processing hardware 104 of system 100, according to one implementation. As shown in FIG. 3, software code 310 may include dataset parsing module 312, label collation module 314, data sample grouping module 316, partitioning module 318, and training and validation module 320. Also shown in FIG. 3 are dataset 336, data samples 360, partitioning constraint 362, metadata labels 364, desired distribution ratios 366 for each of respective metadata labels 364, data sample groups 368, training data subset 322, and validation data subset 324, as well as machine learning model 338 accessible by software code 310.

Dataset 336, training data subset 322, and validation data subset 324 correspond respectively in general to dataset 136, training data subset 122, and validation data subset 124, in FIG. 1. In other words, dataset 336, training data subset 322, and validation data subset 324 may share any of the characteristics attributed to respective dataset 136, training data subset 122, and validation data subset 124 by the present disclosure, and vice versa. In addition, machine learning model 338 corresponds in general to machine learning model 138 in FIG. 1, and those corresponding features may share any of the characteristics attributed to either corresponding feature by the present disclosure.

Moreover, software code 310, in FIG. 3, corresponds in general to software code 110, in FIG. 1, and those corresponding features may share any of the characteristics attributed to either corresponding feature by the present disclosure. Thus, like software code 310, software code 110 may include modules corresponding respectively to dataset parsing module 312, label collation module 314, data sample grouping module 316, partitioning module 318, and training and validation module 320.

Referring now to FIG. 2A in combination with FIGS. 1 and 3, flowchart 200A begins with receiving dataset 136/336 including multiple data samples 360, at least some of data samples 360 having multiple metadata labels 364 applied thereto (action 210). It is noted that one of the advantages of the present inventive principles over the state-of-the-art is automating partitioning of multi-label datasets, subject to a partitioning constraint. Accordingly, in some implementations, all or substantially all of data samples 360 included in dataset 136/336 may have multiple metadata labels 364 applied thereto. However, in some implementations, dataset 136/336 may include multi-labeled data samples, as well as some data samples having a single applied metadata label.

Dataset 136/336 may include hundreds, thousands, or tens of thousands of data samples 360, which may take a variety of forms. In some implementations, each of data samples 360 may include an image, such as a graphic, a digital photograph, or a video frame, for example. Alternatively, in some implementations, each of data samples 360 may include an audio sample. In still other implementations, each of data samples 360 may be a sample of text including multiple words.

As shown in FIG. 1, in some implementations, dataset 136/336 may be received from user 144 via user system 140, communication network 130, and network communication links 132. In other implementations, dataset 136/336 may be received from data source 134, which in some implementations may be a database storing multiple datasets 136/336. In various implementations, dataset 136/336 may be received by system 100 from user system 140 or data source 134 in action 210. Dataset 136/336 may be received in action 210 by software code 110/310, executed by processing hardware 104 of computing platform 102.

Flowchart 200A further includes identifying partitioning constraint 362 and a partitioning of dataset 136/336 into multiple data subsets (action 220). Dataset 136/336 may include metadata specifying how many data subsets dataset 136/336 is to be partitioned into by system 100, as well as the respective percentages of dataset 136/336 to be assigned to each partition or data subset. In some implementations, for example, dataset 136/336 may be partitioned into two data subsets, such as training data subset 122/322 and validation data subset 124/324. However, in other implementations, dataset 136/336 may be partitioned into more than two data subsets, as described below by reference to an exemplary use case in which dataset 136/336 is partitioned into an integer number "k" of data subsets.

For example, the present novel and inventive principles may be applied to a technique known as k-fold Cross Validation that is used to evaluate the performance of a machine learning model. According to a conventional implementation of that technique, a dataset is shuffled randomly and partitioned into k groups. For each of the k groups: 1) that group is held out as test data, 2) the remaining groups are used as a training data set, 3) the machine learning model is fit on the training data set and evaluated on the test data, and 4) an evaluation score is retained while the trained machine learning model is discarded. The performance of the machine learning model is then assessed using the sample of k model evaluation scores.

Instead of shuffling to split the dataset into k random groups, the novel and inventive principles disclosed in the present application can be used to ensure the k groups are representative of all the labels. This could be advantageous or desirable for testing the performance of a particular machine learning model.

Partitioning constraint 362 is a rule providing that data may not be assigned to a particular dataset partition if that assignment would violate any condition imposed by the constraint. In other words, partitioning constraint 362 forces a set of data samples to be located on the same data subset or partition, without necessarily specifying which partition. Partitioning constraint 362 may differ based on the type of data included in data samples 360. As one example, where data samples 360 are video frames, partitioning constraint 362 may preclude video frames from the same shot or the same scene of video content to be assigned to different data subsets, i.e., dataset partitions. By way of definition, it is noted that as used in the present application, the term "shot," as applied to video content, refers to a sequence of frames of video that are captured from a unique camera perspective without cuts and/or other cinematic transitions, while a scene refers to two or more consecutive shots.

In some implementations, partitioning constraint 362 may be identified in action 220 based on metadata included in dataset 136/336. As noted above, in different implementations, partitioning constraint 362 may differ based on the form taken by data samples 360. For example, and as also noted above, where data samples 360 are video frames, partitioning constraint 362 may preclude video frames from the same shot or the same scene of video content to be assigned to different data subsets. As another example, where data samples 360 are audio samples, partitioning constraint 362 may preclude audio from the same audio track or the same multi-track audio file from being assigned to different data subsets. As yet another example, where each of data samples 360 includes multiple words, partitioning constraint 362 may preclude words from the same sentence, the same paragraph, the same title, or the same location description, i.e., "place-name," from being assigned to different data subsets. Action 220 may be performed by software code 110/310, executed by processing hardware 104 of computing platform 102, and using dataset parsing module 312.

Flowchart 200A further includes obtaining, for each of metadata labels 364, desired distribution ratio 366 based on the number of data subsets into which dataset 136/336 is being partitioned and the total number of instances that each of metadata labels 364 has been applied to data samples 360 (action 230). Desired distribution ratio 366 for each of metadata labels 364 may be obtained in action 230 by software code 110/310, executed by processing hardware 104 of computing platform 102, and using label collation module 314.

In implementations in which dataset 136/336 is partitioned into training data subset 122/322 and validation data subset 124/324, it is typically advantageous for training data subset 122/322 to include more of data samples 360 of dataset 136/336 than a number of data samples 360 of dataset 136/336 included in validation data subset 124/324. That is to say, the partitioning ratio of dataset 136/236 in those implementations would favor training data subset 122/322. It is noted that as defined for the purposes of the present application, the expression "partitioning ratio" refers to the ratio between the number of data samples in one data subset and the total number of data samples in the full dataset. In practice, a partitioning ratio of training data subset 122/322 to dataset 136/336 is typically greater than or equal to 0.6 and less than 1.0. In some implementations, it may be advantageous or desirable for the partitioning ratio of training data subset 122/322 to dataset 136/336 to be approximately 0.9.

Figure 4:
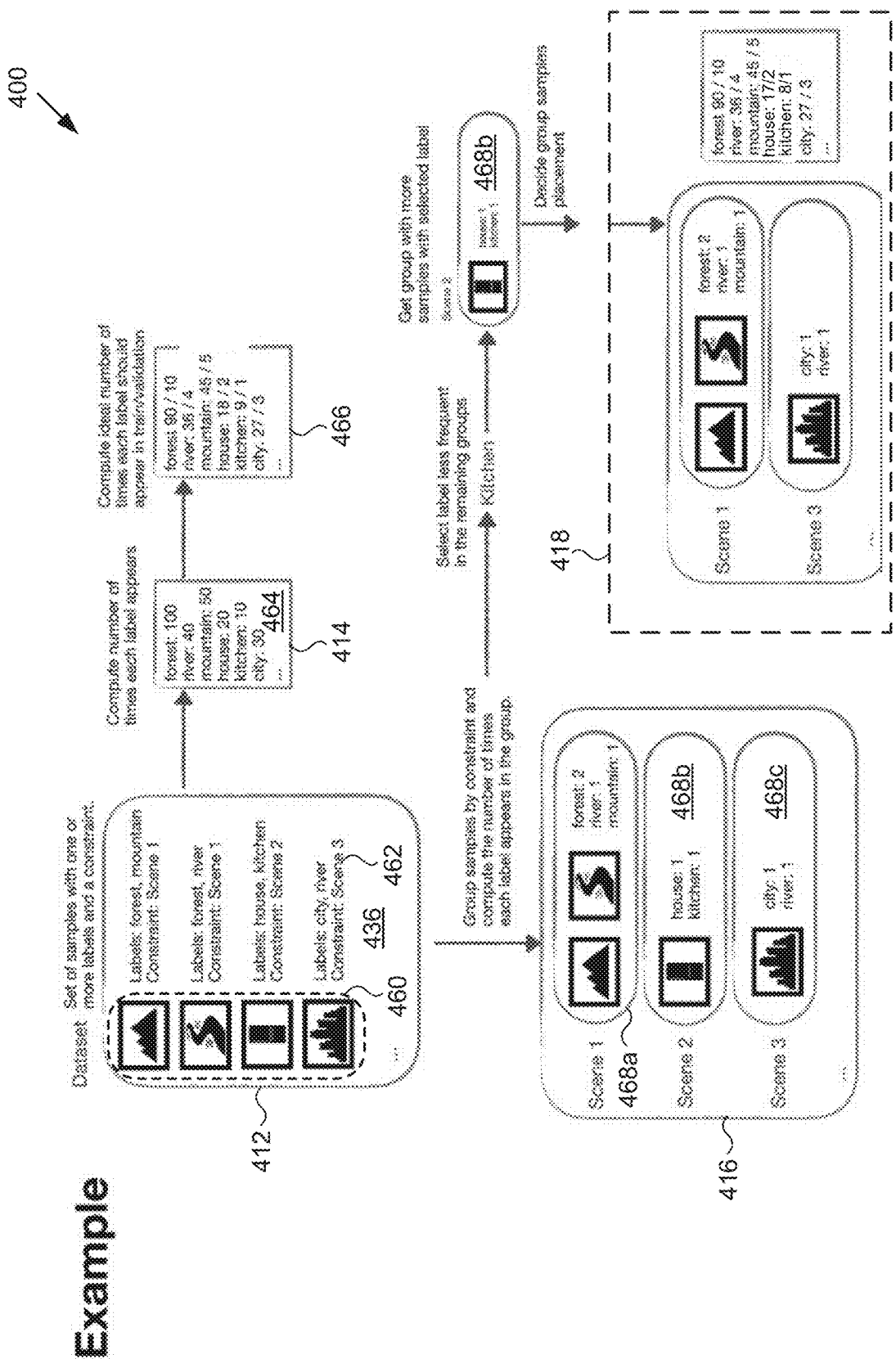
FIG. 4 shows an exemplary diagram depicting execution of the method outlined by the flowcharts of FIGS. 2A and 2B, according to one implementation.

Referring to FIG. 4, FIG. 4 shows exemplary diagram 400 depicting execution of the method outlined by the flowchart 200A, according to one implementation. According to the exemplary use case shown in FIG. 4, diagram 400 includes dataset 436 of data samples 460 in the form of video frames, metadata labels 464 applied to data samples 460, and partitioning constraint 462 requiring that video frames from the same scene of video be assigned to the same partition, i.e., the same data subset. In addition, diagram 400 includes dataset parsing module 412, label collation module 414, data sample grouping module 416, and partitioning module 418. Also shown in FIG. 4 are desired distribution ratios 466 for metadata labels 464, i.e., the desired number of samples of each of metadata labels 464 to be included in each data subset, and exemplary data sample groups 468a, 468b, and 468c (hereinafter "data sample groups 468a-468c").

Dataset 436 corresponds in general to dataset 136/336 in FIGS. 1 and 3. That is to say, dataset 436 may share any of the characteristics attributed to dataset 136/336 by the present disclosure, and vice versa. In addition, data samples 460, partitioning constraint 462, metadata labels 464, desired distribution ratio 466, and data sample groups 468a-468c in FIG. 4, correspond respectively in general to data samples 360, partitioning constraint 362, metadata labels 364, desired distribution ratio 366, and data sample groups 368, in FIG. 3. Thus, data samples 460, partitioning constraint 462, metadata labels 464, desired distribution ratio 466, and data sample groups 468a-468c may share any of the characteristics attributed to respective data samples 360, partitioning constraint 362, metadata labels 364, desired distribution ratio 366, and data sample groups 368 by the present disclosure, and vice versa.

It is noted that desired distribution ratio 366/466 is computed for each of metadata labels 364/464 by applying the partitioning ratio described above to the total number of instances that a particular one of metadata labels 364/464 appears in dataset 136/336/436. For example, and assuming a 0.9 partitioning ratio for training data subset 122/322 and a 0.1 partitioning ratio for validation data subset 124/324, as shown in FIG. 4, for the metadata label "forest" appearing one hundred times in dataset 136/336/436, desired distribution ratio 366/466 is ninety instances of forest in training data subset 122/322 and ten instances of forest in validation data subset 124/324. Analogously, for the metadata label "river" appearing forty times in dataset 136/336/436, desired distribution ratio 366/466 is thirty-six instances of river in training data subset 122/322 and four instances of river in validation data subset 124/324, and so forth.

Although the partitioning ratio is usually applied to all labels uniformly to determine desired distribution ratio 366/466 for each metadata label, meaning that the same partitioning ratio applies to all labels in a dataset, in some instances the way that particular metadata labels are allocated among partitions may vary. For example, metadata labels that are only sparsely present in dataset 136/336/436, for example a metadata label appearing fewer than ten times in dataset 136/336/436 in a use case in which a 0.9 partitioning ratio for training data subset 122/322 and a 0.1 partitioning ratio for validation data subset 124/324 are being used, the desired distribution ratio may be such that all instances of that sparsely present metadata label be allocated to training data subset 122/322 and none be allocated to validation data subset 124/324.

Dataset parsing module 412, label collation module 414, data sample grouping module 416, and partitioning module 418, in FIG. 4, correspond respectively in general to dataset parsing module 312, label collation module 314, data sample grouping module 316, and partitioning module 318, in FIG. 3. Consequently, dataset parsing module 412, label collation module 414, data sample grouping module 416, and partitioning module 418 may share any of the characteristics attributed to respective dataset parsing module 312, label collation module 314, data sample grouping module 316, and partitioning module 318 by the present disclosure, and vice versa.

Referring to FIGS. 1, 2A, 3, and 4 in combination, desired distribution ratio 366/466 for each of metadata labels 364/464 may be obtained by computing the number of times each of metadata labels 364/464 appears in dataset 136/336/436, and applying the partitioning identified in action 220 to that total. For example, according to the exemplary use case shown in FIG. 4, the partitioning identified in action 220 specifies that ninety percent (90%) of data samples 360/460 included in dataset 136/336/436 should be assigned to training data subset 122/322, and the remaining ten percent (10%) of data samples 360/460 should be assigned to validation data subset 124/324.

As a result, and as noted above, metadata label 364/464 "forest," which appears one hundred times in dataset 136/336/436 is associated with a desired distribution ratio 366/466 of 90/10, such that it is desirable for training data subset 122/322 to include ninety instances of metadata label 364/464 "forest" and for validation data subset 124/324 to include ten instances of "forest." Analogously, metadata label 364/464 "city" appears thirty times in dataset 136/336/436, resulting in a desired distribution ratio 366/466 of 27/3 for "city," i.e., twenty-seven instances of "city" in training data subset 122/322 and three instances of "city" in validation data subset 124/324.

Flowchart 200A further includes aggregating, using partitioning constraint 362/462, data samples 360/460 into multiple data sample groups 368/468a-468c (action 240). Aggregation of data samples 360/460 into data sample groups 368/468a-468c may be performed by software code 110/310, executed by processing hardware 104 of computing platform 102, and using data sample grouping module 316/416.

According to the use case shown in FIG. 4, merely be way of example, data samples 360/460 in the form of video frames are grouped based on the scene of video content in which each is included. Thus, all video frames from scene 1 of the video content included in dataset 136/336/436 are aggregated into data sample group 468a, all video frames from scene 2 are aggregated into data sample group 468b, and all video frames from scene 3 are aggregated into data sample group 468c. It is emphasized, however, that data samples 360/460 may assume a variety of different forms, and that partitioning constraint 362/462 may vary depending upon the nature of data samples 360/460. For example, as noted above, in some use cases, data samples 360/460 may be audio samples, and partitioning constraint 362/462 may preclude audio from the same audio track or the same multi-track audio file from being assigned to different data subsets. As another example, and as also noted above, in some use cases data samples 360/460 may include multiple words, and partitioning constraint 362/462 may preclude words from the same sentence or the same paragraph from being assigned to different data subsets.

Flowchart 200A further includes assigning, using partitioning constraint 362/462 and desired distribution ratio 366/466 for each of metadata labels 364/464, each of data sample groups 368/468a-468c to one of the data subsets identified in action 220, e.g., to one of training data subset 122/322 or validation data subset 124/324, where each of the data subsets are unique (action 250). In some use cases, the number of instances that a particular one or more of metadata labels 364/464 has been applied to data samples 360/460 may be too few to make partitioning of the data samples tagged by those metadata labels practical, based on a predetermined threshold number of instances, for instance. In use cases in which data subsets include training data subset 122/322 and validation data subset 124/324, for example, it may be advantageous or desirable to assign all data sample groups including such sparsely applied metadata labels 364/464 to training data subset 122/322 rather than to validation data subset 124/324. Referring to FIG. 4, for example, in some implementations, when any metadata label has been applied ten or fewer times to data samples 360/460, such as metadata label 364/464 "kitchen," all data sample groups including data samples tagged by metadata label 364/464 "kitchen" may be assigned to training data subset 122/322 by default. However, in other implementations, substantially all of data sample groups 368/468a-468c may be assigned in action 250 based on multiple criteria, as described below by further reference to FIG. 2B.

Referring to FIG. 2B in combination with FIGS. 1, 2A, 3, and 4, as noted above, FIG. 2B shows flowchart 200B presenting a more detailed outline of action 250 in flowchart 200A, according to one implementation. It is noted that the assignment of each of data sample groups 368/468a-468c to a data subset or partition in action 250, as well as actions 251, 252, 253, 254, 255, 256, 257, and 258 (hereinafter "actions 251-258"), may be performed by software code 110/310, executed by processing hardware 104 of computing platform 102, and using partitioning module 318/418.

As shown in FIG. 2B, in some implementations, action 250 may include selecting a metadata label from among metadata labels 364/464 (action 251). In one implementation, for example, the metadata label selected in action 251 may be the metadata label having been applied to the fewest of data sample groups 368/468a-468c, or any one of such metadata labels when there is a tie for application to the fewest of data sample groups 368/468a-468c. Referring to FIG. 4, metadata label 364/464 "kitchen," for example may be the selected metadata label in action 251.

Action 250 may further include identifying one or more of data sample groups 368/468a-468c having the most instances of the metadata label selected in action 251 than other data sample groups 368/468a-468c (action 252). Action 250 may further include identifying a first data sample group of the one or more data sample groups identified in action 252 for assignment to one of the data subsets identified in action 220 (action 253). Referring to FIG. 4, as noted above, metadata label "kitchen" was selected in action 251. Action 252 identifies data sample group 468b as one of the data sample groups including the most instances of the metadata label "kitchen." Because no other data sample group includes more than one instance of the metadata label "kitchen," data sample group 468b may be identified as the first data sample group for assignment in action 253. It is noted that in instances in which two or more data sample groups are tied with the most instances of the metadata label selected in action 251, i.e., action 252 identifies more than one data sample group, any one of those data sample groups may be identified for assignment in action 253.

Action 250 may further include determining, using desired distribution ratio 366/466 for the metadata label selected in action 251 and partitioning constraint 362/462, a first data subset of the data subsets identified in action 220 for assignment of the first data sample group, e.g., data sample group 468b (action 254). In some implementations, that first data subset may be the one data subset associated with the most desired instances of the metadata label selected in action 251. For example, referring to FIG. 4, desired distribution ratio 366/466 for metadata label 364/464 "kitchen" includes nine instances in training data subset 122/322 and one instance in validation data subset 124/324. Thus, according to the exemplary use case shown in FIG. 4, training data subset 122/322 may be determined as the first data subset for assignment of data sample group 468b identified in action 253. In the event of a tie, i.e., two or more data subsets tied for the most desired instances of the metadata label selected in action 251, it may be advantageous or desirable to identify the one of the tied data subsets having the most total desired metadata labels as the first data subset in action 254.

However, in some use cases in which the data subsets identified in action 220 include training data subset 122/322 and validation data subset 124/324, and where only a single one of data sample groups 368/468a-468c includes the metadata label selected in action 251, and also where validation data subset 124/324 presently does not include any instances of that selected metadata label, validation data subset 124/324 may be determined as the first data subset in action 254 in order to ensure that at least one instance of the metadata label selected in action 251 is represented in validation data subset 124/324.

Assignment of the data sample group identified in action 253 to the first data subset determined in action 254 results in an assigned data sample group, e.g., data sample group 468b, and one or more unassigned data sample groups, e.g., data sample groups 468a and 468c. Desired distribution ratio 366/466 may be updated to account for the results of action 254. For example, determination that data sample group 468b is to be assigned to training data subset 122/322 reduces the number of desired instances of the metadata label "kitchen" in training data subset 122/322 by the number of instances of "kitchen" in data sample group 468b. In addition, determination that data sample group 468b is to be assigned to training data subset 122/322 also reduces the number of desired instances of other metadata labels in training data subset 122/322 included in data sample group 468b by the number of instances of those other metadata labels in data sample group 468b.

For example, in addition to the metadata label "kitchen," data sample group 468b includes the metadata label "house." As a result, and because data sample group 468b is being assigned to training data subset 122/322 as a group due to partitioning constraint 362/462, the desired instances of each of the metadata labels "kitchen" and "house" is reduced by one in the example shown in FIG. 4. That is to say, due to the number of instances of "kitchen" and "house" in data sample group 468b being assigned to training data subset 122/322, the additional desired number of instances of the metadata label "kitchen" in training data subset 122/322 is reduced from nine to eight, while the desired number of instances of "kitchen" in validation data subset 124/324 remains unchanged. Analogously, the additional desired number of instances of the metadata label "house" in training data subset 122/322 is reduced from eighteen to seventeen, while the desired number of instances of "house" in validation data subset 124/324 remains unchanged.

As further shown in FIG. 2B, action 250 may further include selecting another metadata label from among metadata labels 364/464 (action 255). In one implementation, for example, the other metadata label selected in action 255 may be a metadata label included in any unassigned data sample group 468a/468c having been applied to the fewest of unassigned data sample groups 468a-468c, or any one of such metadata labels when there is a tie for application to the fewest of unassigned data sample groups 468a-468c.

Action 250 may further include identifying one or more of unassigned data sample groups 468a/468c having the most instances of the metadata label selected in action 255 (action 256). Action 250 may further include identifying one of the one or more previously unassigned data sample groups 468a/468c identified in action 256 as a second data sample group for assignment (action 257). Action 257 may be performed in a manner analogous to action 253, described above, as applied to unassigned data sample groups 468a/468c.

Action 250 may further include determining, using the desired distribution ratio 366/466 for the metadata label selected in action 255 and partitioning constraint 362/462, a second data subset of the data subsets identified in action 220 for assignment of the second data sample group identified for assignment in action 257 (action 258). In some implementations, that second data subset may be the one data subset associated with the most desired instances of the metadata label selected in action 255. In the event of a tie, i.e., two or more data subsets tied for the most desired instances of the metadata label selected in action 255, it may be advantageous or desirable to identify the one of the tied data subsets having the most total desired metadata labels as the second data subset in action 258.

However, in some use cases in which the data subsets identified in action 220 include training data subset 122/322 and validation data subset 124/324, and where only a single one of unassigned data sample groups 368/468a/468c includes the metadata label selected in action 255, and also where validation data subset 124/324 presently does not include any instances of that selected metadata label, validation data subset 124/324 may be determined as the second data subset in action 258 in order to ensure that at least one instance of the metadata label selected in action 255 is represented in validation data subset 124/324.

Assignment of the previously unassigned data sample group identified in action 257 to the second data subset determined in action 258 results in a second assigned data sample group, e.g., one of data sample groups 468a of 468c, and fewer unassigned data sample groups. Desired distribution ratio 366/466 may be updated to account for the results of action 258, and actions 255, 256, 257, and 258 may be repeated until all data sample groups 368/468a-468c have been assigned to a data subset, e.g., one of training data subset 122/322 or validation data subset 124/324, subject to partitioning constraint 362/462.

Referring to FIG. 2A in combination with FIGS. 1 and 3, in some implementations, flowchart 200A may further include training machine learning model 138/338 using one of the data subsets identified in action 220 (action 260). For example, in some implementations, machine learning model 138/338 may be trained using training data subset 122/322. Training of machine learning model 138/338 may be performed by software code 110/310, executed by processing hardware 104 of computing platform 102, and using training and validation module 320.

In some implementations, flowchart 200A may conclude with validating, using another one of the data subsets identified in action 220, machine learning model 138/338 (action 270). For example, in some implementations, machine learning model 138/338 may be validated using validation data subset 124/324. Validation of machine learning model 138/338 may be performed by software code 110/310, executed by processing hardware 104 of computing platform 102, and using training and validation module 320.

With respect to the actions outlined by flowcharts 200A and 200B, it is emphasized that actions 210, 220, 230, 240, 250 including actions 251-258, and 260, or actions 210, 220, 230, 240, 250 including actions 251-258, 260, and 270, may be performed in an automated process from which human involvement may be omitted.

Thus, present application discloses constrained multi-label dataset partitioning systems and methods for automated machine learning that overcome the drawbacks and deficiencies in the conventional art. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
   a computing platform including a processing hardware and a system memory storing a software code;
   the processing hardware configured to execute the software code to:
   receive, as part of an automated process, a dataset including a plurality of data samples, wherein each of at least some of the plurality of data samples has a plurality of metadata labels applied thereto, the dataset further including metadata specifying (i) how many data subsets the dataset is to be partitioned into, and (ii) a partitioning constraint for partitioning the dataset into a plurality of data subsets;
   identify, as part of the automated process, the partitioning constraint and a partitioning of the dataset into the plurality of data subsets;
   obtain, as part of the automated process, for each of the plurality of metadata labels, a desired distribution ratio based on the plurality of data subsets and a total number of instances that each of the plurality of metadata labels has been applied to the plurality of data samples;
   aggregate, as part of the automated process and subject to the partitioning constraint, the plurality of data samples into a plurality of data sample groups;
   assign, as part of the automated process, subject to the partitioning constraint and using the desired distribution ratio for each respective one of the plurality of metadata labels, each of the plurality of data sample groups to one of the plurality of data subsets, wherein each of the plurality of data subsets are unique;
   train, as part of the automated process and using one of the plurality of data subsets, a machine learning model to provide a trained machine learning model; and
   annotate media content, using the trained machine learning model.

2. The system of claim 1, wherein to assign each of the plurality of data sample groups to one of the plurality of data subsets, the processing hardware is further configured to execute the software code to:

select a metadata label from the plurality of metadata labels;
identify a first data sample group of the plurality of data sample groups having a most instances of the selected metadata label;
determine, using the desired distribution ratio for the selected metadata label and subject to the partitioning constraint, a first data subset of the plurality of data subsets; and
assign the first data sample group to the first data subset,
wherein assigning the first data sample group to the first data subset results in at least one unassigned data sample group remaining in the plurality of data sample groups.

3. The system of claim 2, wherein to assign each of the plurality of data sample groups to one of the plurality of data subsets, the processing hardware is further configured to execute the software code to:
select another metadata label from the plurality of metadata labels, the another metadata label being different from the metadata label;
identify a second data sample group of the at least one unassigned data sample group having a most instances of the selected another metadata label;
determine, using the desired distribution ratio for the selected another metadata label and subject to the partitioning constraint, a second data subset of the plurality of data subsets; and
assign the second data sample group to the second data subset,
wherein assigning the second data sample group to the second data subset results in at least one other unassigned data sample group remaining in the plurality of data sample groups.

4. The system of claim 3, wherein the selected metadata label is a metadata label of the plurality of metadata labels applied to a fewest of the plurality of data sample groups, and wherein the selected another metadata label is another metadata label of the plurality of metadata labels applied to a fewest of the at least one unassigned data sample group.

5. The system of claim 1, wherein the processing hardware is further configured to execute the software code to:
validate the trained machine learning model, as part of the automated process, using another one of the plurality of data subsets.

6. The system of claim 1, wherein the plurality of data subsets comprise a training data subset and a validation data subset, and wherein a partitioning ratio of the training data subset to the dataset is greater than or equal to 0.6 and less than 1.0.

7. The system of claim 1, wherein the plurality of data samples comprise a plurality of images.

8. The system of claim 7, wherein the plurality of images comprise a plurality of video frames including first video frames, and wherein the partitioning constraint precludes the first video frames from one of a same shot or a same scene of video content from being assigned to different data subsets.

9. The system of claim 1, wherein the plurality of data samples comprise a plurality of audio samples including first audio samples, and wherein the partitioning constraint precludes the first audio samples from one of a same audio track or a same multi-track audio file from being assigned to different data subsets.

10. The system of claim 1, wherein each of the plurality of data samples comprise a plurality of words including first words, and wherein the partitioning constraint precludes the first words from one of a same sentence, a same paragraph, a same title, or a same place-name from being assigned to different data subsets.

11. A method for use by a system including a computing platform having a processing hardware and a system memory storing a software code, the method comprising:
receiving, by the software code executed by the processing hardware as part of an automated process, a dataset including a plurality of data samples, wherein each of at least some of the plurality of data samples has a plurality of metadata labels applied thereto, the dataset further including metadata specifying (i) how many data subsets the dataset is to be partitioned into, and (ii) a partitioning constraint for partitioning the dataset into a plurality of data subsets;
identifying, by the software code executed by the processing hardware as part of the automated process, the partitioning constraint and a partitioning of the dataset into the plurality of data subsets;
obtaining, by the software code executed by the processing hardware for each of the plurality of metadata labels as part of the automated process, a desired distribution ratio based on the plurality of data subsets and a total number of instances that each of the plurality of metadata labels has been applied to the plurality of data samples;
aggregating, by the software code executed by the processing hardware as part of the automated process, subject to the partitioning constraint, the plurality of data samples into a plurality of data sample groups;
assigning, by the software code executed by the processing hardware as part of the automated process, subject to the partitioning constraint and using the desired distribution ratio for each respective one of the plurality of metadata labels, each of the plurality of data sample groups to one of the plurality of data subsets, wherein each of the data subsets are unique;
training, by the software code executed by the processing hardware as part of the automated process and using one of the plurality of data subsets, a machine learning model to provide a trained machine learning model; and
annotating media content, using the trained machine learning model.

12. The method of claim 11, wherein assigning each of the plurality of data sample groups to the one of the plurality of data subsets further comprises:
selecting, by the software code executed by the processing hardware, a metadata label from the plurality of metadata labels;
identifying, by the software code executed by the processing hardware, a first data sample group of the plurality of data sample groups having a most instances of the selected metadata label;
determining, by the software code executed by the processing hardware and using the desired distribution ratio for the selected metadata label and subject to the partitioning constraint, a first data subset of the plurality of data subsets; and
assigning, by the software code executed by the processing hardware, the first data sample group to the first data subset;
wherein assigning the first data sample group to the first data subset results in at least one unassigned data sample group remaining in the plurality of data sample groups.

13. The method of claim 12, wherein assigning each of the plurality of data sample groups to the one of the plurality of data subsets further comprises:
- selecting, by the software code executed by the processing hardware, another metadata label from among the plurality of metadata labels, the another metadata label being different from the metadata label;
- identifying, by the software code executed by the processing hardware, a second data sample group of the at least one unassigned data sample group having a most instances of the selected another metadata label;
- determining, by the software code executed by the processing hardware and using the desired distribution ratio for the selected another metadata label and subject to the partitioning constraint, a second data subset of the plurality of data subsets; and
- assigning, by the software code executed by the processing hardware, the second data sample group to the second data subset;
- wherein assigning the second data sample group to the second data subset results in a at least one other unassigned data sample group remaining in the plurality of data sample groups.

14. The method of claim 13, wherein the selected metadata label is a metadata label of the plurality of metadata labels applied to a fewest of the plurality of data sample groups, and wherein the selected another metadata label is another metadata label of the plurality of metadata labels applied to a fewest of the at least one unassigned data sample group.

15. The method of claim 11, further comprising:
- validating, by the software code executed by the processing hardware as part of the automated process and using another one of the plurality of data subsets, the trained machine learning model.

16. The method of claim 11, wherein the plurality of data subsets comprise a training data subset and a validation data subset, and wherein a partitioning ratio of the training data subset to the dataset is greater than or equal to 0.6 and less than 1.0.

17. The method of claim 11, wherein the plurality of data samples comprise a plurality of images.

18. The method of claim 17, wherein the plurality of images comprise a plurality of video frames including first video frames, and wherein the partitioning constraint precludes the first video frames from one of a same shot or a same scene of video content from being assigned to different data subsets.

19. The method of claim 11, wherein the plurality of data samples comprise a plurality of audio samples including first audio samples, and wherein the partitioning constraint precludes the first audio samples from one of a same audio track or a same multi-track audio file from being assigned to different data subsets.

20. The method of claim 11, wherein each of the plurality of data samples comprise a plurality of words including first words, and wherein the partitioning constraint precludes first words from one of a same sentence, a same paragraph, a same title, or a same place-name from being assigned to different data subsets.

* * * * *